Nov. 18, 1941. J. J. RILEY 2,263,104
NOZZLE
Filed June 30, 1939
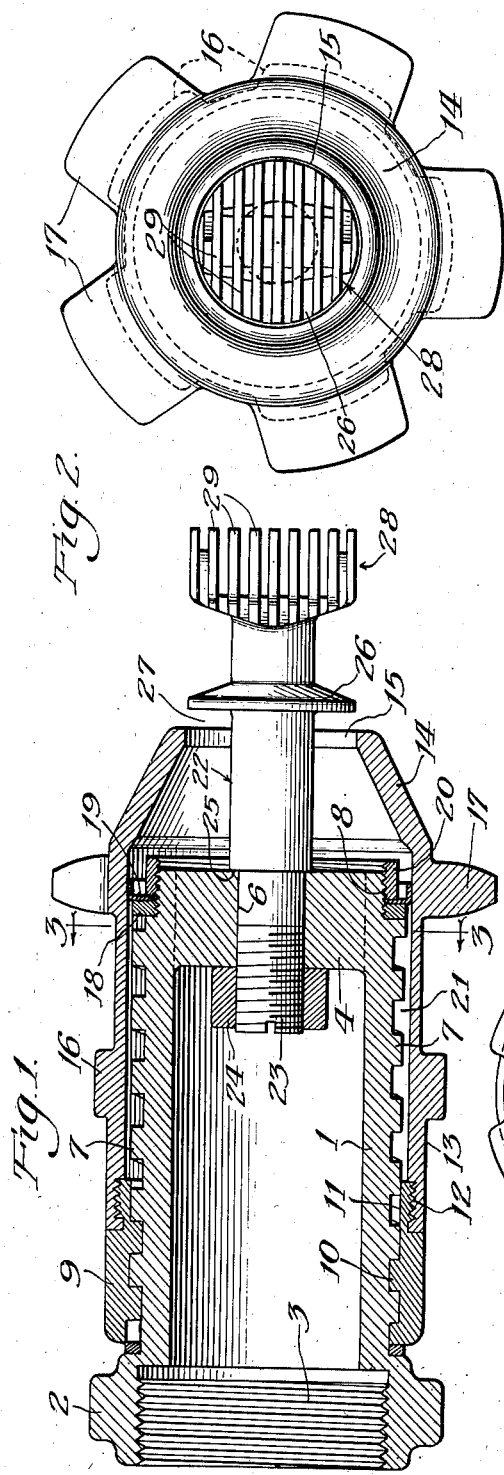
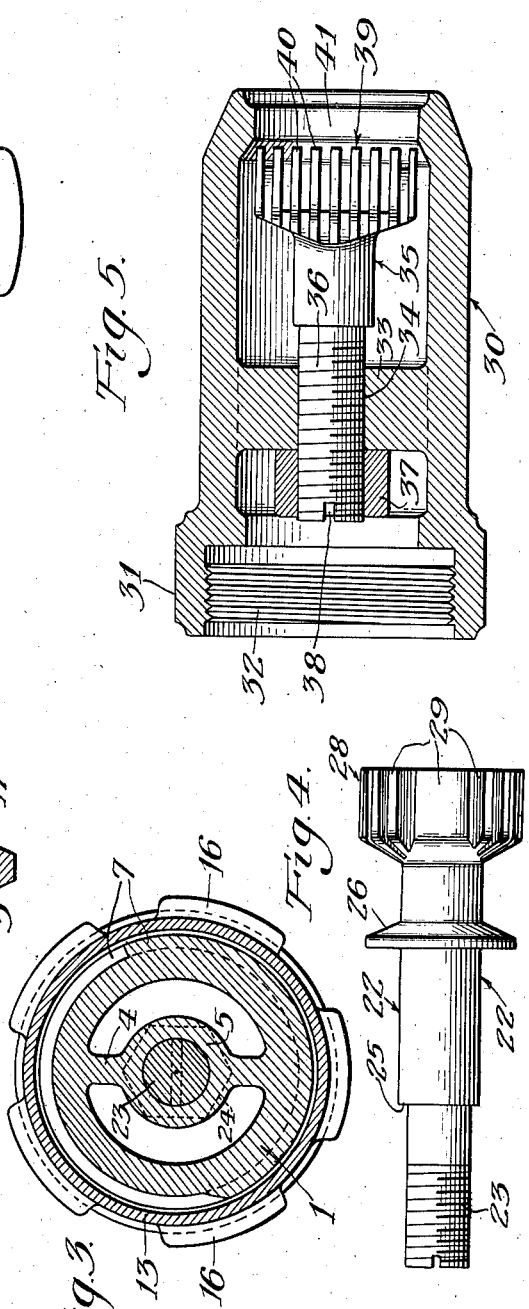
Inventor:
John J. Riley,
By: Lee J. Gay
Attorney Patented Nov. 18, 1941

2,263,104

UNITED STATES PATENT OFFICE 2,263,104

NOZZLE

John J. Riley, Chicago, Ill.

Application June 30, 1939, Serial No. 282,003

2 Claims. (Cl. 299—141)

This invention relates to improvements in liquid discharging nozzles particularly adaptable for fire fighting purposes, and refers specifically to a nozzle construction which effectively reduces a liquid stream flowing under pressure to a fog-like state and yet permits said stream of fog-like globules to be projected over a relatively great distance.

In fighting "chemical" fires, that is, burning gasoline, alcohol or other highly inflammable materials, the most effective procedure involves the smothering of the fire. A solid stream of water as such is ineffective since it merely splashes or spreads the burning materials, which, nevertheless, continue to burn. Nozzles have heretofore been proposed which reduce a hose stream to fog-like globules, which, unlike a solid stream, do not reach the burning materials with sufficient velocity and momentum to splash or spread the same, but merely establishes a fog-like atmosphere in the vicinity of the burning materials which smothers the flame. However, such nozzles are only partially effective since they necessitate that the fire fighters approach the flaming materials very closely, which is sometimes impossible because of the heat and is always dangerous.

My present invention comprises a nozzle which effectively atomizes the hose stream and yet permits the operators to stand at a convenient and safe distance from the fire. The degree of atomization produced is sufficient to smother the most persistent fire, but the hose stream is so broken up that the globules will travel a greater distance than heretofore possible.

The objects and advantages of my invention will be apparent from the accompanying drawing and following detailed description.

In the drawing, Fig. 1 is a longitudinal sectional view of my improved nozzle.

Fig. 2 is an end view of said nozzle.

Fig. 3 is a transverse sectional view of the nozzle taken on line 3—3 of Fig. 1.

Fig. 4 is a detail elevational view of the atomizing member, viewed in a position at right angles to that shown in Fig. 1.

Fig. 5 is a longitudinal sectional view of a slight modification of my invention.

Referring in detail to the drawing, 1 indicates a cylindrical housing which terminates at one end in a fitting 2 provided with internal threads 3. A rib 4 is disposed diametrically across the opposite end of the fitting, the central portion of the rib being enlarged, as at 5, and being provided with an aperture 6 disposed coaxially with the cylinder 1. The external surface of the cylinder 1 is threaded, preferably carrying square threads 7. The end of the cylinder 1 adjacent the rib 4 carries screw threads 8, the purpose of which will be hereinafter more fully described.

A ring 9 is adapted to embrace the housing 1, said ring carrying internal threads 10 adapted for engagement with threads 7. The ring 9 terminates at one end in an inwardly offset annular flange 11 which is externally threaded, as at 12. Rotary movement of ring 9 causes, by virtue of the engaging screw threads 7 and 10, relative axial movement of the ring 9 with respect to the housing 1.

An outer housing 13 also embraces the inner housing 1 and adjacent one end is provided with screw threads adapted for engagement with the threads 12 whereby housing 13 may be detachably secured to ring 9. The opposite end of the housing 13 is tapered inwardly in a conical manner as shown at 14 in Fig. 1, and the end of the housing is provided with a circular aperture 15. An intermediate portion of the outer housing 13 carries circularly spaced projections 16 provided for the convenient removal of the housing from the ring 9. Adjacent the base of the tapered portion 14, circularly spaced projections 17 are carried for conveniently rotating housing 13 and ring 9 with respect to the inner housing 1.

An internally threaded ring 18 is adapted for engagement with screw threads 8 and an annular member 19 of angle cross-section seats upon said ring. A threaded collar 20 also engages threads 8 and functions to secure the member 19 in seated position. A lubricant (not shown) may, if desired, be contained in the space 21 between the inner and outer housings and the member 19 serves to seal the lubricant, if used, in position and also to keep water and dirt from entering the space 21.

A rod-like member 22 is provided with screw threads 23 adjacent one end, and is adapted to be secured in aperture 6 by means of nut 24, the threaded end of the member being restricted in diameter providing a shoulder 25 which abuts the central portion 5 of rib 4 when the nut 24 is drawn tight.

Intermediate the length of the member 22 a disc 26 is carried, said disc being slightly smaller in diameter than aperture 15 whereby said disc may be drawn through said aperture when the outer housing is rotated with respect to the inner housing.

In operation, fitting 2 is connected to a mating fitting carried upon a flexible fire hose (not shown). Water under relatively high pressure is discharged into the interior of fitting 1 and is projected through aperture 15. When an "umbrella" type of spray is desired the disc 26 is positioned as shown in Fig. 1, and the water is discharged as a fine spray or fog through the annular opening 27. This setting of my device produces a fine fog-like spray which covers considerable area but lacks appreciable projected distance. In this regard it resembles nozzles heretofore used. If, however, a spray form of this type is desired, it can be obtained with my device.

At the outer end of the member 22 a head 28 is formed and comprises a grating consisting of a plurality of plates 29 disposed in spaced plane parallel relationship, said plates being positioned along lines corresponding to cords of a circle defined by the ends of the plates. The diameter of the circle thus formed is substantially equal to the diameter of the disc 26, whereby rotation of the outer housing 13 with respect to the inner housing 1 causes the tapered end of the outer housing to embrace the head 28.

In operation, when it is desired to use head 28, the same is positioned within the tapered portion of the housing 13 with the top of the plates substantially flush with the lower edge of the aperture 15. In this position the water passing through the housings is broken up into a plurality of parallel sheets projected outwardly parallel to the axis of the nozzle. In this manner the thin sheets of water can be projected a greater distance than is possible where the water is deflected at an angle to its passage through the nozzle. Of course, the air resistance encountered by the sheets of water eventually break up the sheets into fog-like globules which efficiently function to smother a fire at considerable distance from the nozzle.

By moving the head outwardly relative to the position thereof hereinbefore described, the spray is widened with a corresponding loss in projected distance. However, the projected distance of the spray is greater than is possible to obtain utilizing the disc type of deflector.

Referring particularly to Fig. 5, a slight modification of my invention is illustrated. In this form of my invention a single cylindrical housing 30 is provided at one end with a fitting 31 which is internally threaded as at 32. The housing 30 is adapted to be carried upon the end of a pipe (not shown) preferably an L-shaped pipe whereby the housing may be inserted through a hole in a floor, ceiling or wall and the pipe rotated to smother a fire the exact location of which is not known.

The housing 30 carries a diametrically extending rib 33 which is enlarged at its central portion wherein a threaded aperture 34 is provided. A rod-like member 35 terminates at one end in a threaded shank 36 which is adapted to threadedly engage in aperture 34. A lock nut 37 is engaged upon the end of shank 36 and functions to lock shank 36 in desired position. The end of shank 36 is provided with a slot 38 whereby said shank may be conveniently turned to raise or lower the member 35 before the lock nut is drawn tight.

The head 39 of the member 35 is similar to head 28 and is provided with a plurality of spaced parallel plates 40, the ends of which define a circle slightly lesser in diameter than aperture 41 provided in the end of housing 30. The position of head 39 with respect to aperture 41 is, of course, adjustable, but due to the nature of the use to which this form of my invention is adapted, an adjustment, once made, is usually retained permanent. The nature of the spray produced by the head 39 is similar to that hereinbefore described in conjunction with head 28.

I claim as my invention:

1. A liquid discharge nozzle comprising a substantially cylindrical housing, said housing being provided with an inlet and discharge openings at opposite ends thereof, a member mounted in said housing, means for axially adjusting said member to predetermined positions within said housing, a plurality of spaced substantially parallel plates carried at one end of said member adjacent the outlet opening, said plates being disposed with their planes substantially parallel to the axes of the housing and adapted to divide a liquid stream passing through said housing and discharged therefrom into a plurality of substantially parallel spaced sheets of liquid.

2. A liquid discharge nozzle comprising in combination an inner substantially cylindrical housing and an outer substantially cylindrical housing embracing said inner housing, said inner housing being provided with an inlet opening for liquid, and said outer housing being provided with a discharge opening for liquid, said openings being in substantially axial alignment, a member mounted upon said inner housing within said outer housing, a plurality of spaced substantially parallel plates carried at one end of said member adjacent the discharge opening, said plates being disposed with their planes substantially parallel to the axes of said housings, means for telescopically moving said inner and outer housing relative to each other to adjustably position said plates within said outer housing adjacent the discharge opening whereby to divide a liquid stream passing through the housings and discharged therefrom into a plurality of substantially parallel spaced sheets of liquid.

JOHN J. RILEY.